May 26, 1925. 1,539,156
J. P. BURGESS
PEACH SEEDER
Filed Jan. 28, 1924
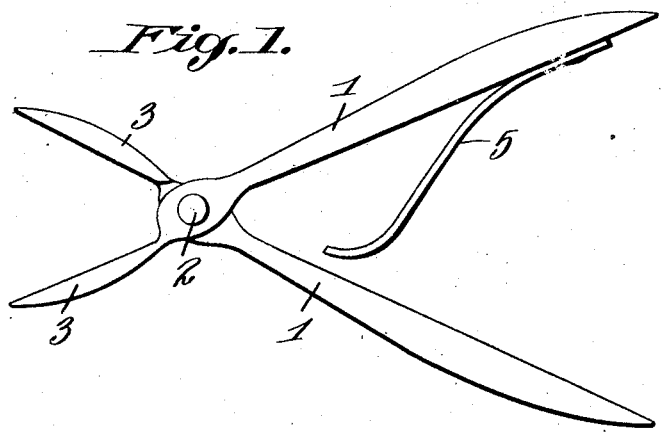
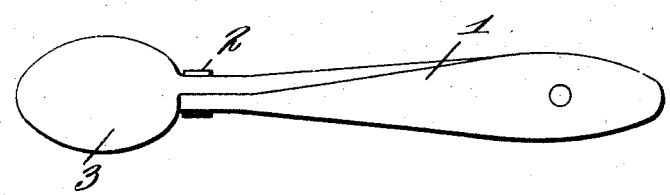
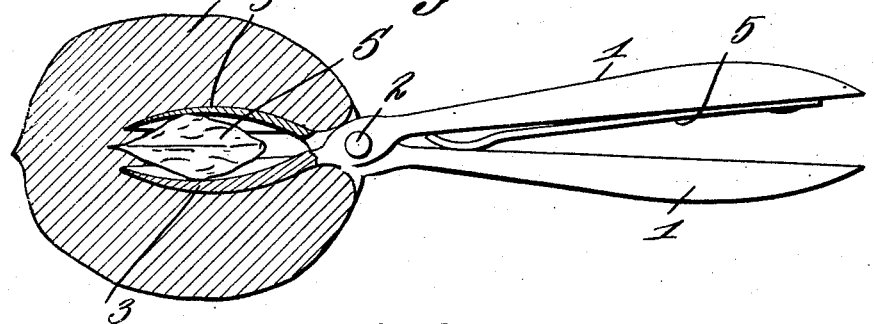
J. P. Burgess, Inventor
By C. A. Snow & Co, Attorney Patented May 26, 1925.

1,539,156

UNITED STATES PATENT OFFICE.

JOSEPH P. BURGESS, OF DEPAUW, INDIANA.

PEACH SEEDER.

Application filed January 28, 1924. Serial No. 689,119.

*To all whom it may concern:*

Be it known that I, JOSEPH P. BURGESS, a citizen of the United States, residing at Depauw, in the county of Harrison and State of Indiana, have invented a new and useful Peach Seeder, of which the following is a specification.

This invention relates to a tool for removing the seeds from peaches, one of the objects of the invention being to provide a simple and efficient tool that can be manipulated readily and will operate efficiently for removing the stones or seeds from all varieties of peaches without necessitating the division of the fruit into two or more parts or otherwise mutilating the same to an undesirable extent.

It is well known that when canning or pickling peaches, it is the practice generally to cut the peach in half and subsequently to cut the seed or stone from the meat in which case the most desirable and best flavored portion of the fruit is usually removed with the stone or seed. This is particularly true with reference to cling stones.

It is an object of the present invention to provide a tool which will remove the stone or seed of a cling stone and leave practically all of that portion of the fruit in proximity to the stone or seed.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings—

Figure 1 is a side elevation of the tool.

Fig. 2 is a plan view thereof.

Fig. 3 is a view partly in side elevation and partly in section showing the tool inserted into a peach, during the act of removing the seed or stone.

Fig. 4 is an enlarged transverse section through one of the jaws.

Referring to the figures by characters of reference 1 designates crossed handles pivotally connected as at 2 and provided with spoon-shaped jaws 3, the edges of which are preferably sharpened as indicated at 4. A spring 5 is preferably interposed between the handle so as to hold them normally spread apart. In using the tool the jaws are pressed together by gripping the handles 1 and are inserted into the peach P and forced into the fruit until the jaws come into contact with the stone or seed S. The jaws are then permitted to open gradually so as to slip along opposed portions of the stone and to cut the fruit therefrom. This insertion of the jaws is continued until the stone or seed is practically fully positioned between the jaws. The handles are then pressed toward each other so as to cause the jaws to tightly grip the stone or seed after which the tool is pulled outwardly, removing the seed or stone from the fruit. Thus the removal is effected without mutilating the fruit except by the formation of the opening in the eye portion. The efficiency of the device is due primarily to the fact that the longitudinally and transversely curved outer surfaces of the jaws are smooth and converge toward the free ends of the jaws and also toward the handles.

What is claimed is:—

A tool for extracting seeds from peaches, comprising pivotally connected levers each having a handle at one end and a spoon shaped jaw at its other end, the two jaws being opposed, similar and imperforate, the outer surface of each jaw being smooth and curved transversely and longitudinally, the free ends of the said outer surfaces converging toward each other and the opposite ends of said surfaces converging toward the handles.

In testimony that I claim the foregoing as my own, I have hereto affixed my signature in the presence of two witnesses.

JOSEPH P. BURGESS.

Witnesses:
ARTHUR B. RICHERT,
SAM'L L. RIELY.